(No Model.)
J. C. HAWLEY & W. J. BLACK.
CONDUIT RAILWAY TROLLEY.
No. 530,688. Patented Dec. 11, 1894.
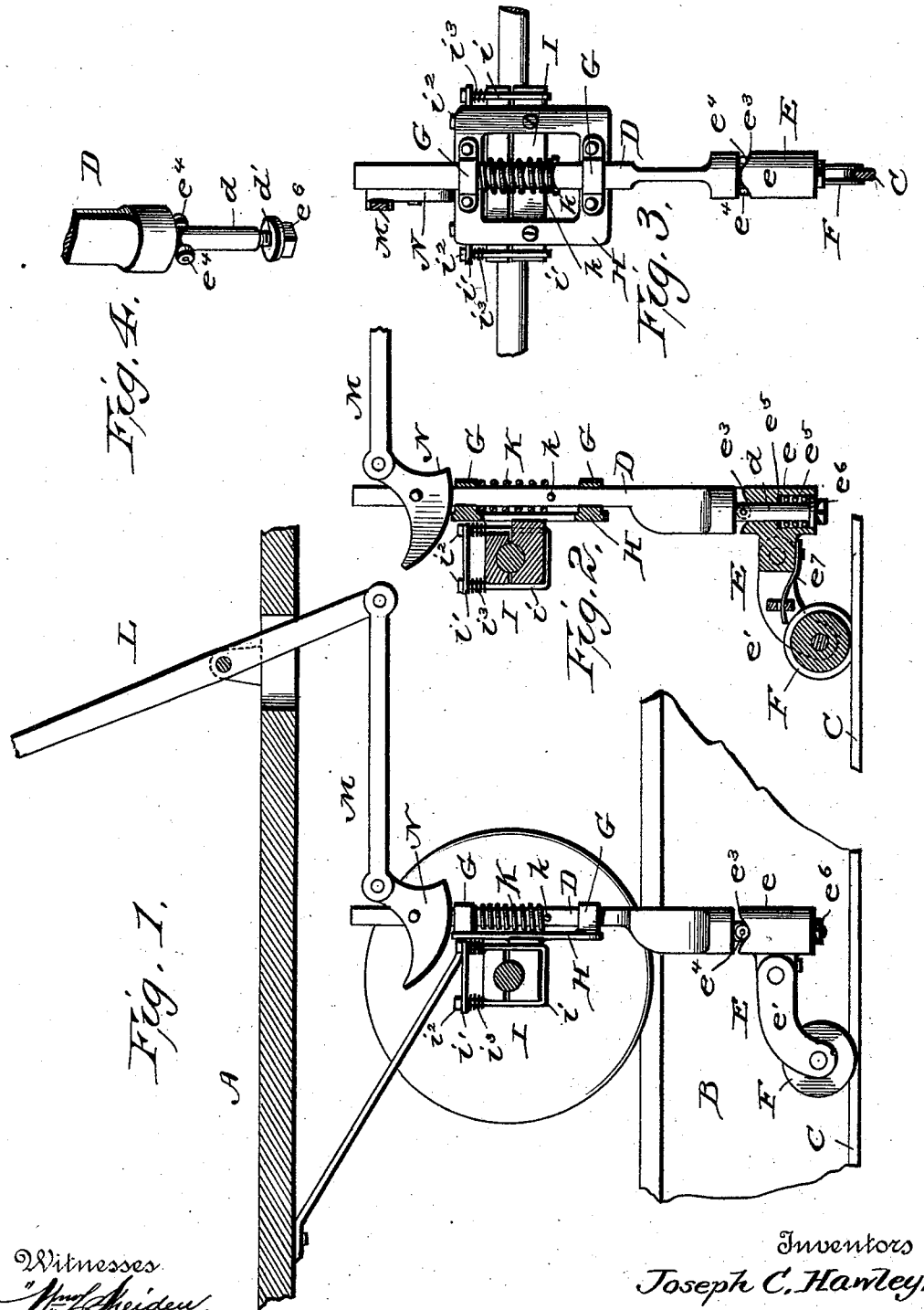
Witnesses
Inventors
Joseph C. Hawley,
William J. Black,
Attorneys

UNITED STATES PATENT OFFICE.

JOSEPH C. HAWLEY AND WILLIAM J. BLACK, OF DUNCANNON, PENNSYLVANIA.

CONDUIT-RAILWAY TROLLEY.

SPECIFICATION forming part of Letters Patent No. 530,688, dated December 11, 1894.

Application filed March 22, 1894. Serial No. 504,708. (No model.)

*To all whom it may concern:*

Be it known that we, JOSEPH C. HAWLEY and WILLIAM J. BLACK, citizens of the United States, residing at Duncannon, in the county of Perry, State of Pennsylvania, have invented certain new and useful Improvements in Trolleys for Underground Systems; and we do hereby declare the following to be a full, clear, and exact description of the invention, such as will enable others skilled in the art to which it appertains to make and use the same.

This invention relates generally to trolleys and particularly to an improved trolley for use in connection with an underground conduit and conductor. Heretofore great difficulty has been experienced in this class of trolleys while rounding curves on account of the trolley jumping the conductor wire. To avoid this difficulty numerous complicated contrivances have been devised.

One of the objects of our invention is to provide a simple and efficient underground trolley, free from all lateral springs or supports which will at all times keep the trolley upon the conductor and one that should the trolley be thrown to one side it will immediately be brought back to its normal position.

Another object of our invention is to provide a reversible contact whereby the trolley can be reversed whenever the direction of the car, to which it is attached, is changed.

Another object is to provide a trolley with an adjustment independent of the supporting standard so that small irregularities on the conductor will not affect the main standard.

Another object is to so arrange the main standard with reference to the wheels and axle that little or no strain will be thrown upon said standard during the turning of a curve.

With these various objects in view our invention consists broadly of an adjustable depending standard attached to the axle of a car, a spring actuated reversible contact connected with said standard and means for raising and lowering the standard and contact.

Our invention consists also in providing a pivotal connection between the contact wheel and main standard whereby sudden jars will be taken up by the contact and not communicated to the standard.

Our invention consists also in certain details of construction and peculiarities of combination all of which will be fully described hereinafter and pointed out in the claims.

In the drawings forming a part of this specification,—Figure 1 is a side elevation of our improved trolley as connected to the car and used in a conduit. Fig. 2 is a sectional view of the same. Fig. 3 is a front view. Fig. 4 is a detail view showing the connection of the standard and trolley.

Referring to the drawings, A indicates the truck of an electric car and B the conduit within which is arranged a conductor C all of said parts being of the usual or any approved construction.

The trolley consists of a vertically adjustable standard D and a reversible spring actuated bracket E adapted to pass into the conduit upon the lower end of the standards and carrying the wheel F which contacts with the conductor wire. The standard D slides vertically in guides G G attached to a skeleton frame H which is secured to a bearing I mounted upon the axle of the car as clearly shown. This bearing is formed of some suitable non-conducting material and is constructed in two sections, an upper and lower one, held together upon the axle by means of the straps $i$, the plates $i'$ and nuts $i^2$ secured above said plates. Between the plate $i^2$ and the upper section of bearing are interposed the springs $i^3$ the purpose of which is to permit the axle to have a limited vertical movement without affecting the trolley standard, the frame H being secured to the lower section of the bearing.

To hold the trolley down upon the conductor C we arrange a stout spiral spring K between the clips G G and surrounding the standard between said clips, the upper end of said spring bearing against the upper clip, while the lower end bears upon a pin or stop $k$ secured to the standard. By this arrangement the standard is always held in its lowermost position, and when released after being raised the spring will return it to its lower position.

In order to elevate the standard and lift the trolley from the conductor, we employ a hand lever L, pivoted upon the car and extending through the floor or platform of the same. To the lower end of this lever is secured a link M, which at its opposite end is connected with a cam lever N pivoted centrally upon the side of the standard D, and having its cam face bearing upon the upper edge of the frame H. Thus by working the hand lever back or forth the trolley can be raised or lowered as desired. The lower end of the standard D is reduced, as shown at $d$, and the extreme end is further reduced and threaded as shown at $d'$. Upon this reduced portion is arranged the trolley bracket E, said bracket comprising a tubular bearing $e$ which fits upon the portion $d$ and the arms $e'$ $e'$ pivotally connected to said bearing at one end, and carrying the contact wheel F between their opposite ends. The upper edge of the bearing $e$ is cam shaped as shown at $e^3$, and bearing upon this edge are two anti friction rollers $e^3$ $e^3$ journaled upon pins driven into the standard D just above the bearing $e$. These pins engage the cam surface of the bearing and lock it in its normal positions, and in order to hold the bearing against said pins and also provide for holding the bracket in a straight line we arrange a spiral spring $e^4$ within the bearing $e$ which bears against an interior shoulder $e^5$, at its upper end, and a nut $e^6$ at its lower end said nut being screwed upon the threaded end $d'$ of the standard and well up into the bearing to permit the turning of the same. A leaf spring $e^7$ is secured to the bearing $e$ and presses upon the arms $e'$, thus holding the wheel firmly upon the conductor and in case any sudden irregularity should be met with this spring will permit the trolley to yield without affecting the standard D. The bearing frame is rigidly braced by means of bars, extending therefrom to the side of the truck or in any other suitable manner. It will thus be seen that we provide an exceedingly cheap and simple trolley for underground systems and one that can be applied to cars now in use. By means of the springs K, and $e^7$, the standard and trolley are always held in their lowermost positions so that a firm contact is always assured, and in case any obstacle should raise them, they will be immediately thrown down again.

Our idea in supporting the trolley from the axle is to take away a great deal of the strain from the trolley while rounding curves, as the wheels, following the track tend to guide the trolley so that there is very little tendency for the trolley to jump the conductor while rounding curves. The connection between the standard and bracket is also such that the bracket can have a limited vibration and the spring within the tubular bearing will serve to keep the trolley straight at all times so that the conductor can be easily found should it be jumped. The trolley is also reversible and can be changed whenever the direction of the car is changed, and after the trolley is once arranged the cam surface and roller pins, serve as locks to guard against displacement.

Having thus described our invention, what we claim, and desire to secure by Letters Patent, is—

1. In an underground system, the combination with a depending standard, of a vertically movable spring actuated bracket arranged upon the lower end of said standard, and extending downward at an angle from said standard, said bracket carrying a contact wheel at its outer end, substantially as shown and described.

2. In an underground system, the combination with a depending standard of the guide frame, the hand lever, the link attached thereto and the cam shaped lever pivotally connected at its end with the link and pivoted intermediate its ends to the standard, the cam face of said lever being adapted to bear upon the guide frame whereby the standard is raised, substantially as shown and described.

3. In an underground system the combination with a depending standard of a reversible trolley-carrying bracket having a vertically movable spring actuated member, substantially as shown and described.

4. In an underground system the combination with the axle of the bearing secured thereto, the frame connected with the bearing, the vertically adjustable standard and the trolley bracket connected therewith, substantially as described.

5. In an underground system the combination with the depending standard of the guide frame, the spring encircling the standard within the limits of the said guide frame, a trolley bracket carried at the lower end of the standard, a cam shaped lever pivoted to the upper end, a hand lever and a link connecting the hand and cam levers whereby when said hand lever is operated the cam face contacts with the guide frame and raises the standard and trolley the spring acting to return the standard and trolley as soon as the hand lever is released, substantially as shown and described.

6. In an underground system, the combination with the axle, of the bearing formed in two sections, the binding straps, and cap plate, the interposed springs, the guide frame, and the depending standard working in the guides of said frame said standard carrying a trolley at its lower end, substantially as shown and described.

7. In an underground system, the combination with a standard, of a trolley bracket connected thereto, said bracket comprising a tubular bearing and an arm pivotally connected therewith, a trolley wheel and a spring attached to the tubular bearing and pressing upon the arms, substantially as shown and described.

8. In an underground system, the combination with the standard reduced as described, of a trolley bracket having a tubular bearing, the spiral spring within said bearing and the nut for securing said parts in place, substantially as shown and described.

9. In an underground system, the combination with a standard having anti friction rollers thereon, the trolley bracket having a tubular bearing the upper edge of said bearing being cam shaped to engage the rollers and means for holding said bearing up against the latter, substantially as shown and described.

10. In an underground trolley the combination with the axle and bearing of the guide frame, the standard, the spring around the same, and levers for raising said standards, the trolley bracket having the pivotal arms, the trolley wheel, and the springs for holding the trolley upon the conductor and in a straight line, substantially as described.

In testimony whereof we affix our signatures in presence of two witnesses.

JOSEPH C. HAWLEY.
WILLIAM J. BLACK.

Witnesses:
JAS. E. WILSON,
SAMUEL A. E. RIFE.